United States Patent
Salkintzis

(10) Patent No.: US 10,595,360 B2
(45) Date of Patent: Mar. 17, 2020

(54) ANDSF AND LWA COEXISTENCE

(71) Applicant: Motorola Mobility LLC, Chicago, IL (US)

(72) Inventor: Apostolis Salkintzis, Athens (GR)

(73) Assignee: MOTORLA MOBILITY LLC, Chicago, IL (US)

( * ) Notice: Subject to any disclaimer, the term of this patent is extended or adjusted under 35 U.S.C. 154(b) by 351 days.

(21) Appl. No.: 15/374,900

(22) Filed: Dec. 9, 2016

(65) Prior Publication Data

US 2018/0167865 A1 Jun. 14, 2018

(51) Int. Cl.
| | |
|---|---|
| H04W 48/02 | (2009.01) |
| H04W 76/38 | (2018.01) |
| H04W 12/08 | (2009.01) |
| H04W 48/14 | (2009.01) |
| H04W 12/00 | (2009.01) |
| H04W 36/36 | (2009.01) |
| H04W 88/06 | (2009.01) |
| H04L 29/06 | (2006.01) |
| H04W 36/00 | (2009.01) |

(52) U.S. Cl.
CPC ......... *H04W 76/38* (2018.02); *H04W 12/001* (2019.01); *H04W 12/08* (2013.01); *H04W 48/14* (2013.01); *H04L 63/0272* (2013.01); *H04L 63/164* (2013.01); *H04W 36/00837* (2018.08); *H04W 36/36* (2013.01); *H04W 88/06* (2013.01)

(58) Field of Classification Search
CPC ..... H04W 76/38; H04W 12/08; H04W 36/36; H04W 48/14; H04W 88/06; H04L 63/029
See application file for complete search history.

(56) References Cited

U.S. PATENT DOCUMENTS

| | | | | |
|---|---|---|---|---|
| 2016/0044570 | A1* | 2/2016 | Jeong | H04L 47/125 370/338 |
| 2016/0234726 | A1* | 8/2016 | Nuggehalli | H04W 36/0022 |
| 2016/0353348 | A1* | 12/2016 | Lee | H04W 76/38 |
| 2018/0270732 | A1* | 9/2018 | Garcia Martin | H04W 48/04 |

* cited by examiner

*Primary Examiner* — Melvin C Marcelo

(74) *Attorney, Agent, or Firm* — Kunzler Bean & Adamson, PC

(57) ABSTRACT

Apparatuses, methods, and systems are disclosed for WLAN selection. One apparatus includes a transceiver that receives a WLAN selection/routing command. The apparatus further includes a controller that identifies whether the apparatus has selected a WLAN. The controller further determines whether to accept WLAN selection/routing commands based on a device configuration and/or whether the apparatus has selected a WLAN. In certain embodiments, the WLAN selection/routing command is a LWA command, RCLWI command, or LWIP command.

18 Claims, 8 Drawing Sheets

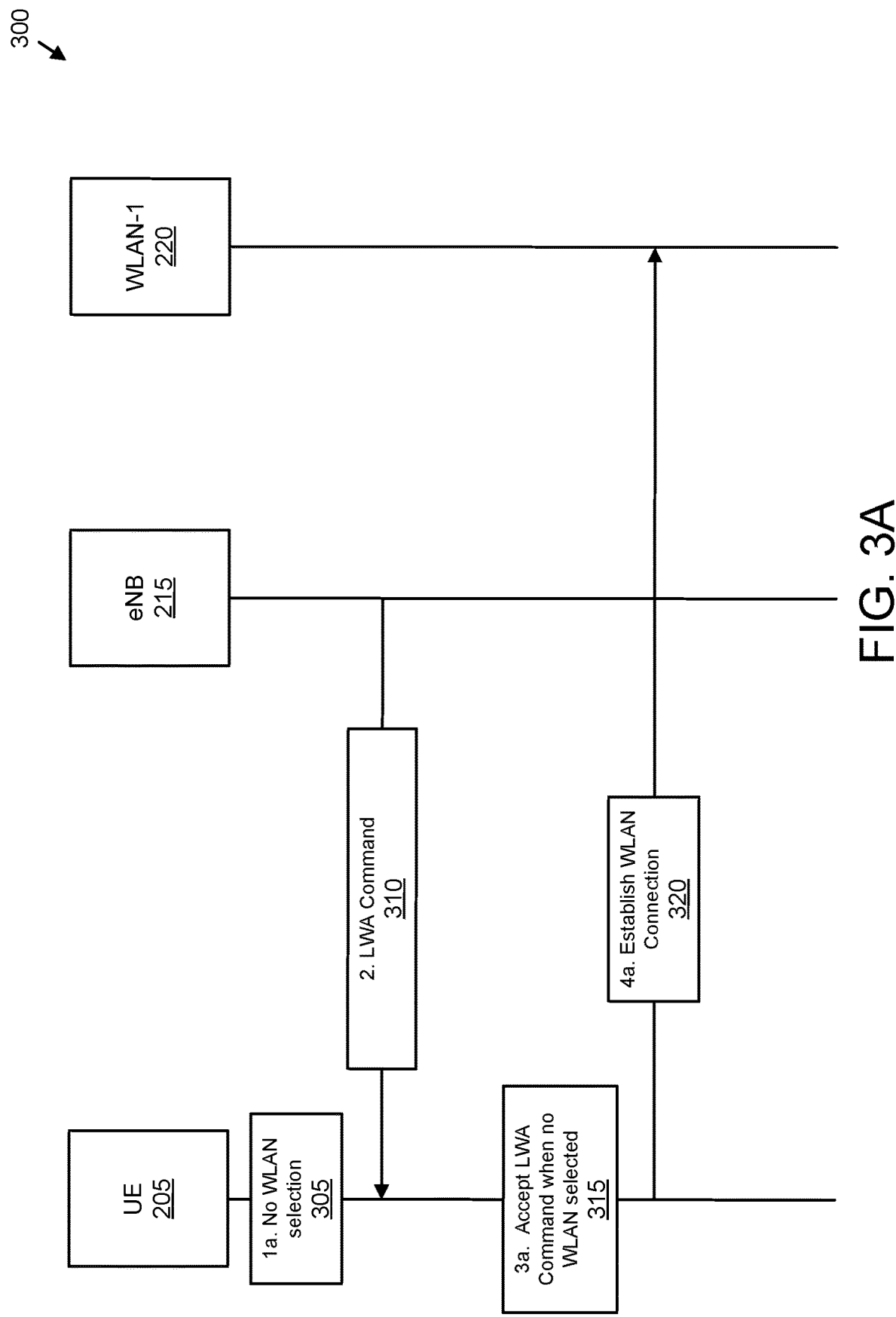

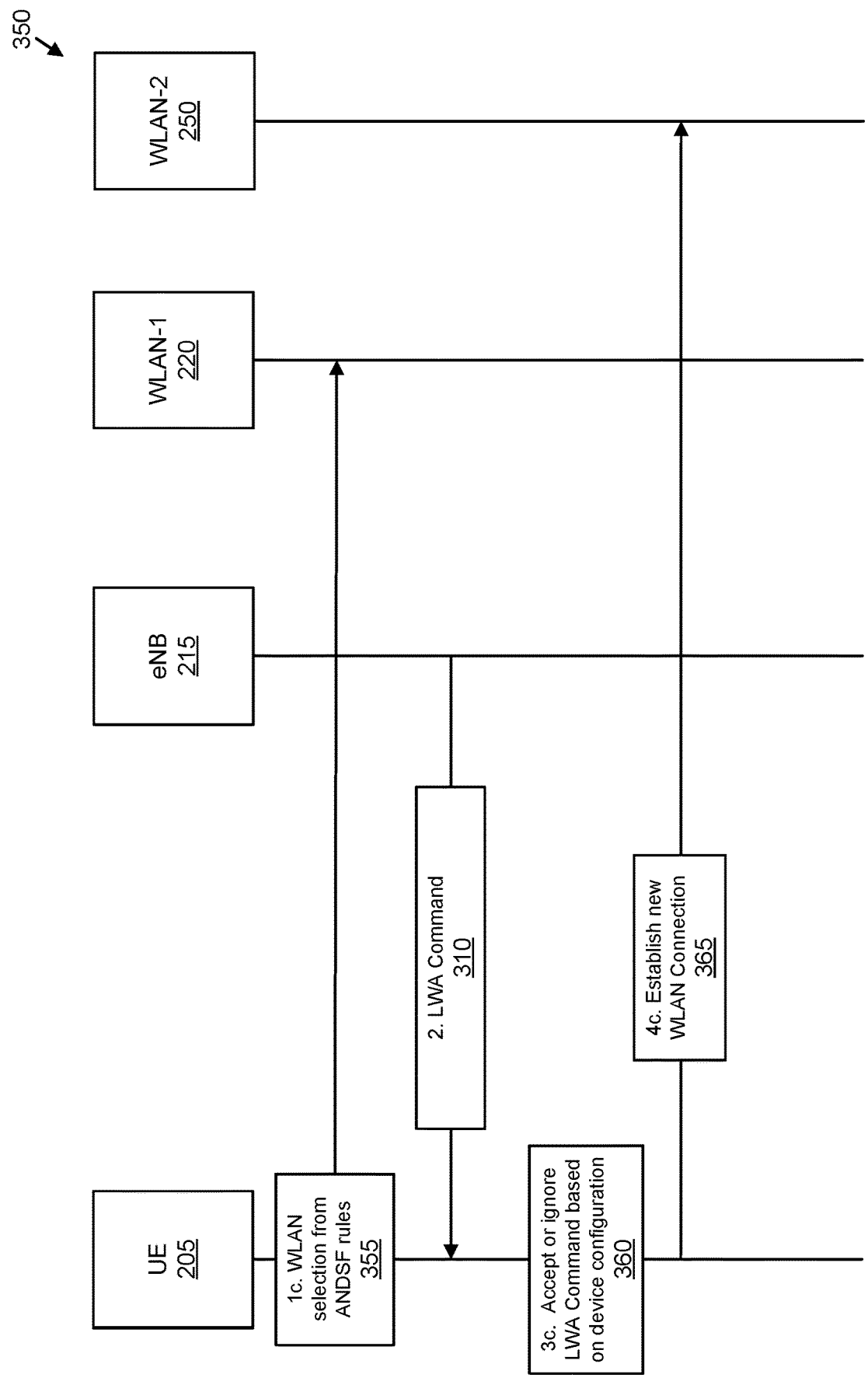

ANDSF AND LWA COEXISTENCE

FIELD

The subject matter disclosed herein relates generally to wireless communications and more particularly relates to determining whether to accept a long-term evolution wireless local area network aggregation ("LWA") command or a RAN controlled LTE-WLAN interworking ("RCLWI") command.

BACKGROUND

The following abbreviations are herewith defined, at least some of which are referred to within the following description.

3GPP Third Generation Partnership Project
ANDSF Access Network Discovery and Selection Function
AP Access Point
APN Access Point Name
DL Downlink
eNB Evolved Node B
EPC Evolved Packet Core
ET SI European Telecommunications Standards Institute
HPLMN Home Public Land Mobile Network
TARP Inter-APN routing policy
IP Internet Protocol
ISRP Inter-System Routing Policy
LAN Local Area Network
LTE Long Term Evolution
LWA Long Term Evolution Wireless Local Area Network Aggregation
LWIP Long Term Evolution Wireless Local Area Aggregation with IPsec tunneling
[This is a $3^{rd}$ type of steering command that can be send to the UE. The method disclosed applies to LWA commands, RCLWI command and LWIP commands.]
MCC Mobile Country Code
MNC Mobile Network Code
NBIFOM Network-Based IP Flow Mobility
NSWO Non-Seamless WLAN Offload
OFDM Orthogonal Frequency Division Multiplexing
PDN Packet Data Network
PGW Packet Data Network Gateway
PLMN Public Land Mobile Network
RAN Radio Access Network
RCLWI Radio Access Network Controlled LTE-WLAN Interworking
SC-FDMA Single Carrier Frequency Division Multiple Access
UDP User Datagram Protocol
UE User Entity/Equipment (Mobile Terminal)
UL Uplink
VPLMN Visited Public Land Mobile Network
WAN Wide Area Network
WLAN Wireless Local Area Network
WLANSP Wireless Local Area Network Selection Policy
WiMAX Worldwide Interoperability for Microwave Access In wireless communications networks, user equipment ("UE") are often capable of communicating with a public land mobile network ("PLMN") both over a cellular radio access network that utilizes licensed spectrum and a wireless local area network ("WLAN") that utilizes unlicensed spectrum. The UE may select a WLAN using various procedures. For example, the UE may select a WLAN based on user preference for user input. As another example, the UE may select a WLAN using access network discovery and selection function ("ANDSF") rules received from the PLMN. In another example, the UE may select a WLAN in response to receiving a network command, such as a LTE-WLAN aggregation ("LWA") command, a RAN controlled LTE-WLAN interworking ("RCLWI") command, or the like.

However, the various WLAN selection procedures may conflict with one another, resulting in the frequent WLAN re-selection. Current rules for ANDSF and LWA coexistence are very inefficient because they restrict the UE to use either ANDSF procedures or LWA procedures within the same PLMN. These rules prevent the UE from using ANDSF procedures and some PLMN areas and LWA procedures and other PLMN areas. Because the LWA feature is expected to be deployed only in certain strategic areas of the PLMN, current ANDSF and LWA coexistence rules are highly inefficient.

For example, if the UE has established one or more data sessions with non-seamless WLAN offload ("NSWO") and the UE accepts a LWA command, the established data sessions will be interrupted because the traffic can be delivered directly to WLAN. Thus, the applications associated with these data sessions need to detect the interruption and reestablish the data sessions (e.g., over 3GPP LTE access).

As another example, if the UE has established a multi-access packet data network ("PDN") connection, such as a network-based IP flow mobility ("NBIFOM") connection, and the UE accepts the LWA command, the no traffic for this PDN connection can further be routed via WLAN based on the NBIFOM routing rules. If the PDN connection operates in the UE-initiated mode, then the UE will be unable to apply its IP flow mobility rules for traffic stirring. If the PDN connection operates in network-initiated mode, then the UE will be unable to apply the routing rules provided by the network. Traffic of the multi-access PDN connection would only be routed via 3GPP access.

In another example, if the UE has established a PDN connection over WLAN in the UE accepts the LWA command, the number traffic can be routed on this PDN connection because no traffic can be delivered directly to the WLAN. Although the UE may successfully hand over the PDN connection to 3GPP access, this handover may cause a long interruption (e.g., due to WLAN release, WLAN scanning, and WLAN reconnection) that may adversely impact real-time data sessions, such as calls over WLAN, leading to negative user experience.

BRIEF SUMMARY

Apparatuses for WLAN selection are disclosed. Methods and systems also perform the functions of the apparatus. In one embodiment, an apparatus for WLAN selection includes a controller that identifies whether the apparatus has selected a WLAN and determines whether to accept WLAN selection/routing commands based on a device configuration and/or whether the apparatus has selected a WLAN. The apparatus further includes a transceiver that receives an WLAN selection/routing command. The controller accepts the command based on the aforementioned determination.

In certain embodiments, the controller accepts the WLAN selection/routing commands in response to identifying that no WLAN is selected. The WLAN selection/routing commands may include LWA commands, RCLWI commands, or LWIP commands.

In some embodiments, determining whether to accept the WLAN selection/routing command includes determining whether a selected WLAN was selected based on user preferences. In response to the apparatus having selected a WLAN based on user preference, the controller ignores the WLAN selection/routing command. In response to the apparatus having selected a WLAN not based on user preference, the controller decides whether to accept (or ignore) the WLAN selection/routing command based solely on the device configuration.

In some embodiments, the device configuration instructs the controller to always accept WLAN selection/routing commands. In other embodiments, the device configuration instructs the controller to only ignore WLAN selection/routing commands received from specific networks. In other embodiments, the device configuration instructs the controller to only accept WLAN selection/routing commands received from specific networks (e.g., specific LTE networks).

In certain embodiments, the transceiver receives a WLAN selection policy (WLANSP") from a network entity and the controller further selects a WLAN based on the WLANSP. In such embodiments, determining whether to accept the WLAN selection/routing command includes the controller accepting or ignoring the WLAN selection/routing command according to the device configuration. In some embodiments, the apparatus further includes a timer that initiates in response to the apparatus entering an idle mode. Here, the controller prevents WLAN re-selection using the WLANSP in response to the timer being active and triggers WLAN re-selection using the WLANSP in response to expiration of the timer. In certain embodiments, the controller stops and resets the timer in response to the apparatus transitioning from the idle mode to a connected mode before expiration of the timer. In further embodiments, the controller selects a WLAN other that one indicated in a preconfigured WLANSP, in response to accepting the WLAN selection/routing command.

A method for WLAN selection includes receiving a WLAN selection/routing command, identifying whether a remote unit has selected a WLAN, and determining whether to accept the WLAN selection/routing command based on one or more of a device configuration of the remote unit and whether the remote unit has selected a WLAN.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A illustrates a first embodiment of a WLAN selection procedure;

FIG. 3C illustrates a third embodiment of a WLAN selection procedure;

DETAILED DESCRIPTION

Figure 1:
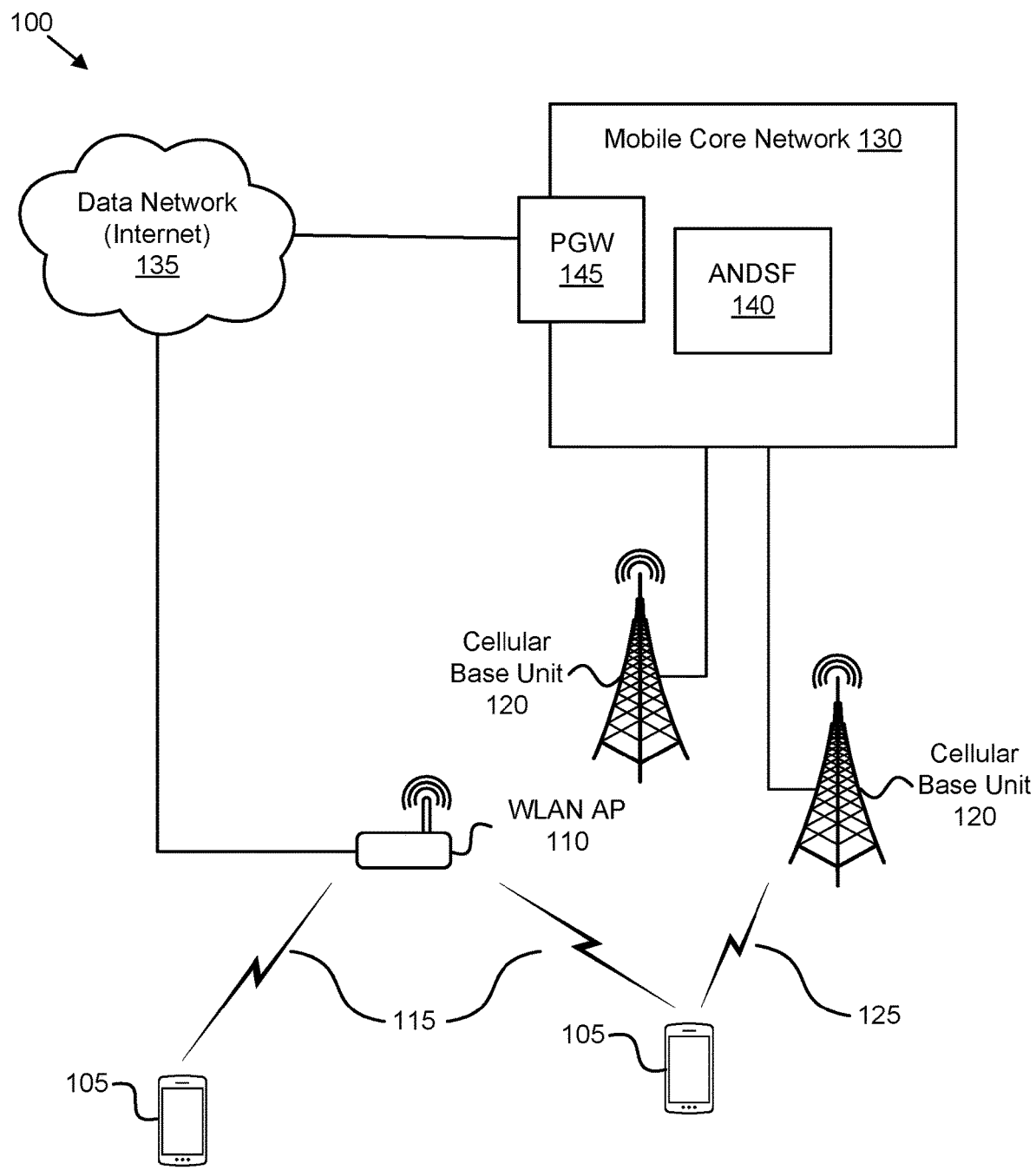
FIG. 1 is a schematic block diagram illustrating one embodiment of a wireless communication system for WLAN selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

To provide efficient procedures for ANDSF and LWA/RCLWI/LWIP coexistence, a UE is configured to selectively accept and reject incoming LWA (or RCLWI or LWIP) signaling. Such configuration allows a UE in a serving PLMN to apply ANDSF procedures in some areas of the PLMN and to also apply LWA/RCLWI/LWIP procedures and other areas of the PLMN. The UE configuration may also limit the frequency of WLAN reselection when the UE has an active ANDSF rule for WLAN selection and accepts LWA/RCLWI/LWIP signaling.

FIG. 1 a wireless communication system 100 for WLAN selection, according to embodiments of the disclosure. In one embodiment, the wireless communication system 100 includes remote units 105, wireless local area network ("WLAN") access points ("APs") 110, WLAN communication links 115, cellular base units 120, and cellular communication links 125. Even though a specific number of remote units 105, WLAN APs 110, WLAN communication links 115, cellular base units 120, and cellular communication links 125 are depicted in FIG. 1, one of skill in the art will recognize that any number of remote units 105, WLAN APs 110, WLAN communication links 115, cellular base units 120, and cellular communication links 125 may be included in the wireless communication system 100.

In one implementation, the wireless communication system 100 is compliant with the long-term evolution ("LTE") of the 3GPP protocol, wherein the cellular base units 120 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the WLAN APs 110 via uplink ("UL") and downlink ("DL") communication signals. Furthermore, the UL and DL communication signals may be carried over the WLAN communication links 115. Similarly, the remote units 105 may communicate with one or more cellular base units 120 via UL and DL communication signals carried over the cellular communication links 125.

The WLAN APs 110 may be distributed over a geographic region. As depicted in FIG. 1, each WLAN AP 110 connects to a data network 135, such as the Internet. Typically, the WLAN APs 110 do not have direct access to the mobile core network 130 (such WLAN deployments are referred to as "un-trusted" WLANs). Instead, the WLAN APs 110 rely on the data network 135 to connect to the mobile core network 130. The mobile core network 130 may provide services to a remote unit 105 via WLAN access (e.g., via the WLAN AP 110), as described in greater detail herein.

Each WLAN AP 110 may serve a number of remote units 105 with a serving area. Typically, a serving area of the WLAN AP 110 is smaller than the serving area of a cellular base unit 120. The WLAN APs 110 may communicate directly with one or more remote units 105 by receiving UL communication signals and transmitting DL communication signals to serve the remote units 105 in the time, frequency, and/or spatial domain. Both DL and UL communication signals are carried over the WLAN communication links 115. A WLAN AP 110 may communicate using unlicensed radio spectrum.

The cellular base units 120 may be distributed over a geographic region. In certain embodiments, a cellular base unit 120 may also be referred to as an access terminal, a base, a base station, a Node-B, an eNB, a Home Node-B, a relay node, a device, or by any other terminology used in the art. The cellular base units 120 are generally part of a radio access network ("RAN") that may include one or more controllers communicably coupled to one or more corresponding cellular base units 120. These and other elements of radio access network are not illustrated but are well known generally by those having ordinary skill in the art.

The cellular base units 120 may serve a number of remote units 105 within a serving area, for example, a cell or a cell sector via a wireless communication link. The cellular base units 120 may communicate directly with one or more of the remote units 105 via communication signals. Generally, the cellular base units 120 transmit downlink ("DL") communication signals to serve the remote units 105 in the time, frequency, and/or spatial domain. Furthermore, the DL communication signals may be carried over the cellular communication links 125. The cellular communication links 125 may be any suitable carrier in licensed or unlicensed radio spectrum. The cellular communication links 125 may communicate with one or more of the remote units 105 and/or one or more of the cellular base units 120.

The cellular base units 120 connect to the mobile core network 130 via the RAN. In one embodiment, the mobile core network 130 is a 5G packet core or the evolved packet core ("EPC") specified in LTE specifications, which may be coupled to other networks, like the Internet and private data networks, among other data networks. The present disclosure is not intended to be limited to the implementation of any particular wireless communication system architecture or protocol. Thus, in a non-LTE implementation, the cellular base units 120 may be coupled to a non-EPC type of packet core network, such as to a "5G" packet core network.

Each mobile core network 130 belongs to a single public land mobile network ("PLMN"). The depicted mobile core network 130 includes at least one PDN gateway ("PGW") 145 communicatively coupled to at least one PDN, here data network 135. The mobile core network 130 further includes at least one access network discovery and selection function ("ANDSF") 140 for providing mobility and/or routing policies for the remote unit 105. The ANDSF 140 may provide the one or more remote units 105 with rules regarding WLAN selection, herein referred to as "ANDSF WLAN selection rules" or merely "ANDSF rules." Even though a specific number of ANDSFs 140 and PGWs 145 are depicted in FIG. 1, one of skill in the art will recognize that any number of ANDSFs 140 and PGWs 145 may be included in the mobile core network 130. Further, the wireless communication system 100 may include any number of mobile core networks 130.

In certain embodiments, a remote unit 105 is provisioned with WLAN selection information by a mobile core network 130, such as the mobile core network 130 of a home PLMN for the remote unit 105. The WLAN selection information may include ANDSF rules provided by the ANDSF 140, device WLAN configuration information, and the like. Additionally, the mobile core network 130 may send a LWA steering command, and RCLWI stirring command, or other steering commands for selecting a WLAN AP 110. WLAN selection is discussed in further detail below with reference to FIGS. 2-6.

Figure 2:
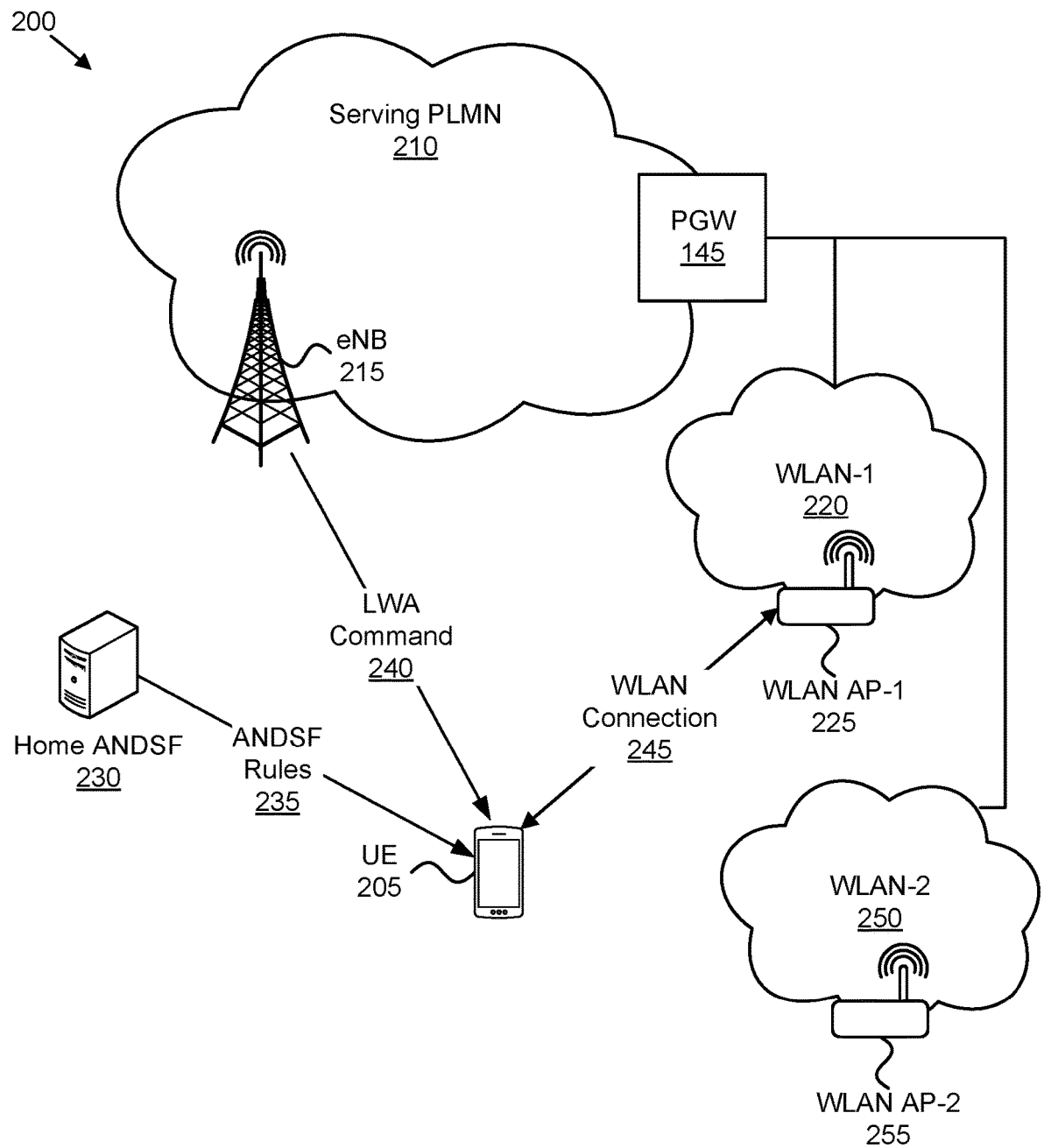
FIG. 2 illustrates one embodiment of network architecture for WLAN selection.

FIG. 2 depicts a network architecture 200 for WLAN selection, according to embodiments of the disclosure. The network architecture 200 depicts a UE 205 in communication with a serving PLMN 210. The UE 205 may be one embodiment of the remote unit 105 discussed above with reference to FIG. 1.

The serving PLMN 210 includes at least one eNB 215. The serving PLMN 210 further includes a PGW 145 in communication with a first WLAN 220 and a second WLAN 250. The first WLAN 220 includes a first WLAN access point ("AP") 225 and the second WLAN 250 includes a second WLAN AP 255. The eNB 215 may be one embodiment of the cellular base unit 120 discussed above with reference to FIG. 1. Similarly, the first WLAN AP 225 and the second WLAN AP 255 may be instances of the WLAN AP 110 discussed above with reference to FIG. 1.

The network architecture 200 includes a home ANDSF 230 of the UE 205. The home ANDSF 230 is an instance of the ANDSF 140 located in the home PLMN of the UE 205. In some embodiments, the serving PLMN 210 is the home PLMN of the UE 205. In such embodiments, the home ANDSF 230 is located in the serving PLMN 210. In other embodiments, the serving PLMN is a visited PLMN of the UE 205. In such embodiments, the home ANDSF 230 is located outside the serving PLMN 210. The home ANDSF 230 provisions the UE 205 with various selection policies, such as the ANDSF rules 235.

Figure 3B:
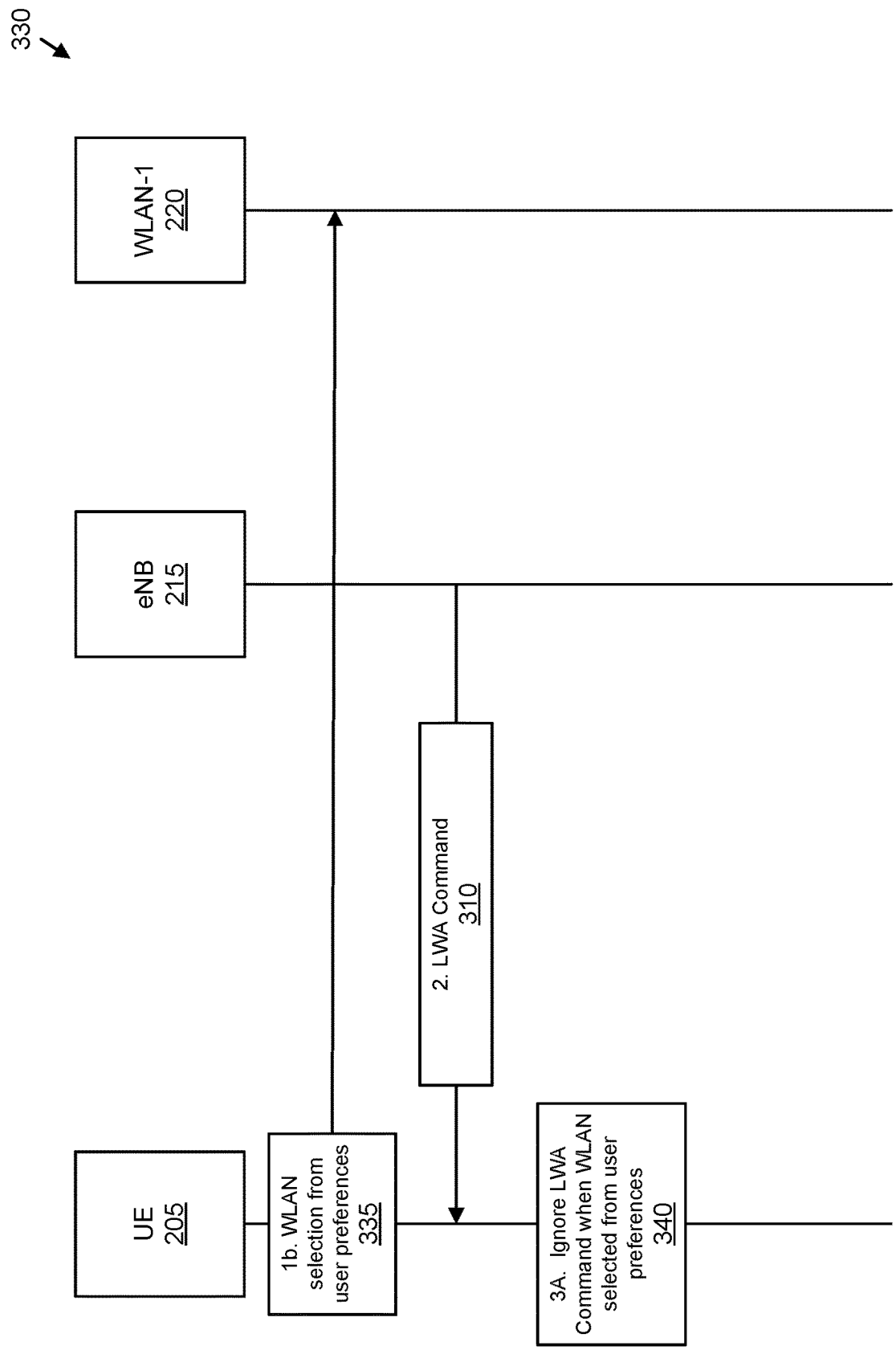
FIG. 3B illustrates a second embodiment of a WLAN selection procedure.

The UE 205 may select a WLAN, such as one of the first WLAN 220 and the second WLAN 250, based on user preference, based on the ANDSF rules 235, or based on a LWA command 240 (or RCLWI command or LWIP command) received from the eNB 215. The UE 205 establishes a WLAN connection 245 with the selected WLAN. Here, the UE 205 is depicted as having a WLAN connection 245 with the first WLAN AP 225. As discussed above, the ANDSF rules 235 may conflict with the LWA command 240. Further, the LWA command 240 may contradict user preferences and user input. The UE 205 resolves conflicts between the user preferences, ANDSF rules 235, and LWA command 240 to select a WLAN. Various procedures for conflict-free WLAN selection are discussed below with reference to FIGS. 3A-3C. While FIGS. 3A-3C depict only LWA commands, the procedures are also applicable to RCLWI commands and LWIP commands.

FIG. 3A depicts a first WLAN selection procedure 300, according to embodiments of the disclosure. The first WLAN selection procedure 300 depicts procedures performed by, and communications among, the UE 205, the eNB 215, and the first WLAN 220, described above with reference to FIG. 2. The first WLAN selection procedure 300 begins by identifying 305 that the UE 205 has not selected a WLAN. In response to identifying that no WLAN is selected, the UE 205 determines to accept all LWA commands.

Here, the UE 205 receives 310 a LWA command from the eNB 215. Because no WLAN has been selected, the UE 205 accepts 315 the LWA command and establishes 320 a WLAN connection, here with the first WLAN 220. In doing so, the UE 205 behaves as required by the base unit 110. Although FIG. 3B depicts a LWA command (item 310), the same principles apply to other WLAN steering commands received from the eNB 215. For example, the UE 205 determines to accept RCLWI commands and LWIP commands in response to identifying that no WLAN is selected.

In some embodiments, the UE 205 overrides WLAN selection policies ("WLANSPs"), inter-system routing policies ("ISRP"), and inter-APN routing policies ("IARPs") when applying WLAN access selection and traffic routing based on the LWA (or RCLWI or LWIP) commands. For example, the UE 205 may receive a RCLWI steering command (e.g., a "move_to_WLAN" commands) to select a WLAN having a specific service set identifier ("SSID") included in the RCLWI command. In this example, the UE 205 connects with the WLAN, receives an IP address, and then attempts to move its traffic to the selected WLAN. In certain embodiments, the UE 205 has a valid TARP rule and applies the internal TARP for access point name ("APN") rules in order to perform traffic routing across established PDN connections.

FIG. 3B depicts a second WLAN selection procedure 330, according to embodiments of the disclosure. The second WLAN selection procedure 330 depicts procedures performed by, and communications among, the UE 205, the eNB 215, and the first WLAN 220, described above with reference to FIG. 2. The second WLAN selection procedure 330 begins by identifying 335 that the UE 205 has selected a WLAN. It is further determined, that the UE 205 has selected the first WLAN 220.

In response to identifying that a WLAN is selected, the UE 205 determines how the WLAN was selected. Here the UE 205 has selected the first WLAN 220 based on user preference. For example, the first WLAN 220 may include a first WLAN AP 225 located at the user's residence or place of work. Alternatively, the user may select the first WLAN AP 225 after purchasing networking services from an operator of the first WLAN.

Because the UE 205 has selected a WLAN based on user preferences, the UE 205 determines to ignore WLAN selection/routing commands. As used herein, WLAN selection/routing commands refer to commands steering the UE 205 to a WLAN access network and include LWA commands, RCLWI commands, and LWIP commands. Ignoring the LWA, RCLWI and/or LWIP commands may include ignoring an RRC_Connection_Reconfiguration command instructing the UE 205 to begin WLAN measurement reports.

Where the UE 205 has selected a WLAN based on ANDSF rules, or other network WLAN selection policy, the UE 205 determines whether the UE 205 includes a device WLAN configuration (e.g., stored in the memory 410). The device WLAN configuration includes instructions for accepting or rejecting WLAN steering commands. The device WLAN configuration may be provided by the home ANDSF. If the home ANDSF does not provide the UE 205 with a device WLAN configuration, then the UE 205 determines to accept LWA commands (and RCLWI/LWIP commands) where the WLAN is selected based on ANDSF rules.

Otherwise, if the UE 205 has selected a WLAN based on ANDSF rules and where the UE 205 includes a device WLAN configuration, then the UE 205 accepts or ignores LWA (and RCLWI/LWIP) commands based solely on the device WLAN configuration. The option to ignore LWA/RCLWI/LWIP signaling in this situation allows the home operator (home PLMN) to configure a roaming UE 205 to always stay connected to preferred WLAN's (e.g., as specified in the WLANSP rules).

FIG. 3C depicts a second WLAN selection procedure 350, according to embodiments of the disclosure. The second WLAN selection procedure 350 depicts procedures performed by, and communications among, the UE 205, the eNB 215, the first WLAN 220, described above with reference to FIG. 2. The second WLAN selection procedure 330 begins by identifying 335 that the UE 205 has selected a WLAN. It is further determined, that the UE 205 has selected the first WLAN 220.

In response to identifying that a WLAN is selected, the UE 205 determines how the WLAN was selected. Here, the UE 205 identifies that the first WLAN 220 was selected based on ANDSF rules. For example, the home ANDSF 230 may provision the UE 205 with a WLAN selection policy ("ANSDF rules"), wherein the UE 205 selects the first WLAN 220 based on the ANDSF rules/policies received from the home ANDSF 230.

Where the UE 205 selects the WLAN based on ANDSF rules, or other network WLAN selection policy, the UE 205 accepts or ignores 360 LWA commands based on a device WLAN configuration. The UE 205 first determines whether it includes a device WLAN configuration (e.g., stored in the memory 410). The device WLAN configuration may be provided by the home ANDSF 230. If the home ANDSF 230 does not provide the UE 205 with a device WLAN configuration, then the UE 205 determines to accept LWA commands (and RCLWI/LWIP commands) where the WLAN is selected based on ANDSF rules. Here the LWA commands are permitted to override the ANDSF rules or other network-provided WLAN selection policy. Accepting the LWA/RCLWI/LWIP commands may include implementing an RRC_Connection_Reconfiguration command instructing the UE 205 to begin WLAN measurement reports.

Otherwise, where the UE 205 selects the first WLAN 220 based on ANDSF rules and where the UE 205 includes a device WLAN configuration, then the UE 205 accepts or ignores 360 LWA (and RCLWI/LWIP) commands based solely on the device WLAN configuration. The option to ignore LWA signaling allows the home operator (home PLMN) to configure a roaming UE 205 to always stay connected to preferred WLANs (e.g., as specified in the WLAN selection policy ("WLANSP") rules). In one embodiment, the device WLAN configuration instructs the UE 205 to always accept (or, alternatively, to always reject) the LWA commands. In another embodiment, the device WLAN configuration indicates a default behavior (e.g., accepting LWA commands) and one or more exceptions, such as network or location where the default behavior is not followed. For example, the device WLAN configuration may instruct the UE 205 to always accept LWA signaling except in certain PLMNs (e.g., "PLMN-a," "PLMN-b," etc.). As another example, the device WLAN configuration may instruct the UE 205 to always ignore LWA signaling except when the UE 205 is located in the home PLMN.

In the depicted embodiment, the device WLAN configuration instructs the UE 205 to accept LWA commands. Accordingly, in response to receiving 310 an LWA command to select the second WLAN AP 255 and route traffic via the second WLAN 250, the UE 205 establishes 365 a new WLAN connection with the second WLAN 250. Thereafter, the UE 205 may implement traffic routing procedures.

In some embodiments, the UE 205 limits the frequency of WLAN re-selection in response to having an active ANDSF rule, such as a WLANSP rule and accepting a LWA/RCLWI/LWIP command. For example, the UE 205 may select the second WLAN 250 while in ECM-CONNECTED mode based on the LWA (or RCLWI or LWIP) command, but select the first WLAN 220 while in ECM-IDLE mode based on an active ANDSF rule. To avoid frequent WLAN re-selection, the UE 205 trigger WLAN re-selection every time it transitions between the ECM_CONENCTED and ECM_IDLE modes. In certain embodiments, the UE 205 ignores the ANDSF for a predetermined amount of time after returning to the ECM-IDLE mode.

In one embodiment, the UE 205 initiates a timer upon entering the ECM-IDLE mode. While the timer is running, the UE 205 will not attempt WLAN selection based on the ANDSF rules. Only upon expiration of the timer will the UE apply the active ANDSF rules to select the first WLAN 220. Additionally, if the UE 205 transitions to the ECM-CONNECTED mode while the timer is active, the UE 205 stops the timer and resets/restarts the timer when the UE returns to the ECM-IDLE mode.

Figure 4:
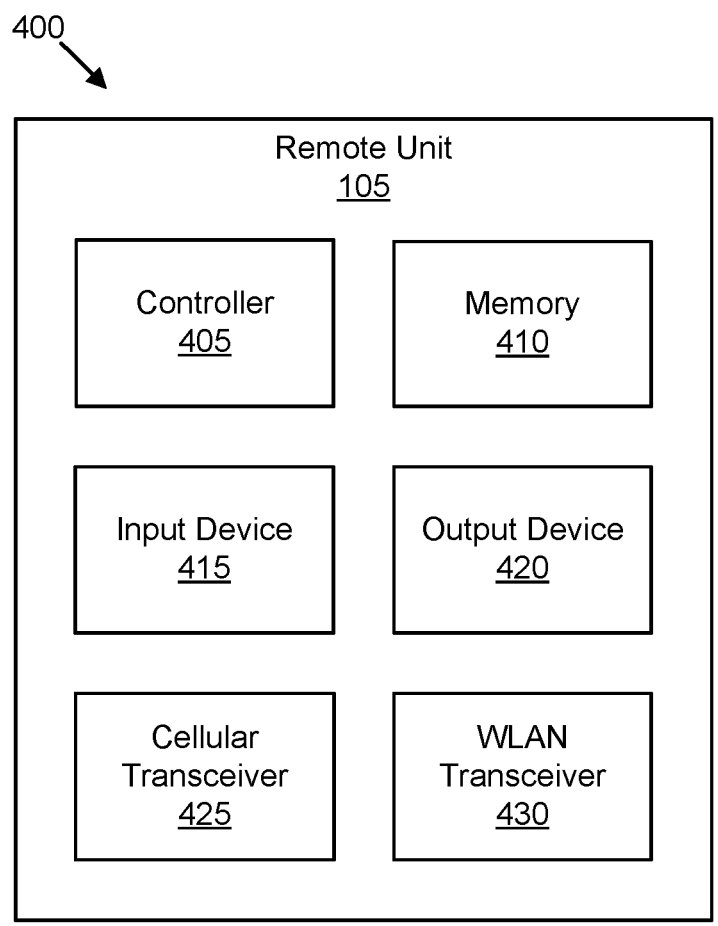
FIG. 4 is a schematic block diagram illustrating one embodiment of an apparatus that may be used for WLAN selection.

FIG. 4 depicts one embodiment of an apparatus 400 that may be used for WLAN selection. The apparatus 400 includes one embodiment of the remote unit 105. Furthermore, the remote unit 105 may include a controller 405, a memory 410, an input device 415, an output device 420, a cellular radio transceiver 425, and a WLAN radio transceiver 430. In some embodiments, the input device 415 and the output device 420 are combined into a single device, such as a touchscreen. In certain embodiments, the remote unit 105 may not include any input device 415 and/or output device 420.

The controller 405, in one embodiment, may include any known controller capable of executing computer-readable instructions and/or capable of performing logical operations. For example, the controller 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the controller 405 executes instructions stored in the memory 410 to perform the methods and routines described herein. The controller 405 is communicatively coupled to the memory 410, the input device 415, the output device 420, the cellular radio transceiver 425, and the WLAN radio transceiver 430.

In certain embodiments, the controller 405 may identify whether the remote unit 105 has selected a WLAN. The controller 405 determines whether to accept an LWA command based on whether the remote unit 105 has selected a WLAN. In certain embodiments, the remote unit 105 is configured with instructions regarding WLAN selection, herein referred to as "a device WLAN configuration". Where the remote unit 105 includes a device WLAN configuration, the controller 405 may also determine whether to accept the LWA command based on the device WLAN configuration.

Thereafter, the controller 405 either accepts or ignores LWA commands based on the determination results. In certain embodiments, the controller 405 sets a flag in the memory 410 indicating whether the remote unit 105 should accept an incoming LWA command, RCLWI command, or a LWIP command. For example, if the transceiver receives the LWA command, the remote unit 105 either accepts or ignores the LWA command (e.g., via the controller 405) based on the value of the flag set in memory 410. Thus, in certain embodiments the controller 405 determines whether to accept or reject an incoming LWA command, RCLWI command, or a LWIP command prior to actually receiving the incoming command.

In response to identifying that no WLAN is selected, the controller 405 determines to accept LWA, RCLWI, and/or LWIP commands. Otherwise, in response to identifying that a WLAN is selected, the controller 405 determines how the WLAN was selected. For example, a WLAN may be selected based on user preferences (e.g., user input). As another example, a WLAN may be selected based on WLAN selection policy, such as ANDSF rules received from the ANDSF 165.

In response to the remote unit 105 selecting a WLAN based on user preferences, the remote unit 105 determines to ignore LWA, RCLWI, and/or LWIP commands. Ignoring the LWA, RCLWI, and/or LWIP commands may include ignoring an RRC_Connection_Reconfiguration command instructing the remote unit 105 to begin WLAN measurement reports.

In response to the remote unit 105 selecting a WLAN based on ANDSF rules, or other network WLAN selection policy, the controller 405 determines whether the remote unit 105 includes a device WLAN configuration (e.g., stored in the memory 410). The device WLAN configuration may be provided by the home ANDSF. If the home ANDSF does not provide the remote unit 105 with a device WLAN configuration, then the controller 405 determines to accept LWA commands (and RCLWI/LWIP commands) where the WLAN is selected based on ANDSF rules.

Otherwise, if the remote unit 105 has selected a WLAN based on ANDSF rules and where the remote unit 105 includes a device WLAN configuration, then the controller 405 accepts or ignores LWA/RCLWI/LWIP commands based solely on the device WLAN configuration. In some situations, a device WLAN configuration instructs the remote unit 105 to always accept LWA/RCLWI/LWIP commands or to always ignore LWA/RCLWI/LWIP commands. In other situations, the device WLAN configuration instructs the remote unit 105 to only accept (or ignore) LWA/RCLWI/LWIP commands that involve specific networks (e.g., specific PLMNs).

In some embodiments, the controller 405 includes a timer function. The controller 405 initiates the timer in response to the remote unit 105 entering in idle mode, such as the ECM-IDLE mode. Because the LWA steering commands apply to WLAN selection in a connected mode, the ANDSF rule may indicate the remote unit 105 should select a different WLAN when in an idle mode. While the timer is active (e.g., unexpired) the controller 405 prevents WLAN reselection using the WLAN selection policy (e.g., ANDSF rules). After the timer expires, the controller 405 triggers WLAN reselection based on the WLAN selection policy. Where the remote unit 105 transitions from the idle mode to a connected mode (e.g., the ECM-CONNECTED mode) before expiration of the timer, the controller 405 stops this timer and triggers WLAN reselection (e.g., using the WLAN selection policy). Typically, the LWA (or RCLWI or LWIP) commands instruct the remote unit 105 to select a WLAN other than one indicated in the (preconfigured) WLAN selection policy.

In certain embodiments, the controller 405 overrides WLANSP, ISRP, and TARP for NWSO rules in response to accepting LWA (or RCLWI or LWIP) steering commands while having an active ANDSF rule for WLAN selection.

Accordingly, the controller 405 connects to the indicated WLAN, receives an IP address at the WLAN, and attempts to move its traffic to the WLAN (e.g., handing over PDN connections to the WLAN). In one embodiment, the remote unit 105 may have a valid TARP rule for APN routing. Here, the controller 405 may apply the internal TARP rule for APN in order to perform traffic steering across already established PDN connections.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to WLAN selection, for example WLAN selection policies, rules, and procedures. In some embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, a liquid crystal display ("LCD") panel, a light emitting diode ("LED") display, an organic LED ("OLED") display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The cellular radio transceiver 425 communicates with a mobile communication network (e.g., a PLMN). In some embodiments, the mobile communication network comprises the cellular base units 120 and a mobile core network 130 discussed above with reference to FIG. 1. The cellular radio transceiver 425 comprises a transmitter used to provide UL communication signals to the cellular base unit 120 and a receiver used to receive DL communication signals from the cellular base unit 120.

The WLAN radio transceiver 430 communicates with a WLAN access point, such as the WLAN AP 110 discussed above with reference to FIG. 1. The WLAN radio transceiver 430 comprises a transmitter used to provide UL communication signals to the WLAN AP 110 and a receiver used to receive DL communication signals from the WLAN AP 110.

Figure 5:
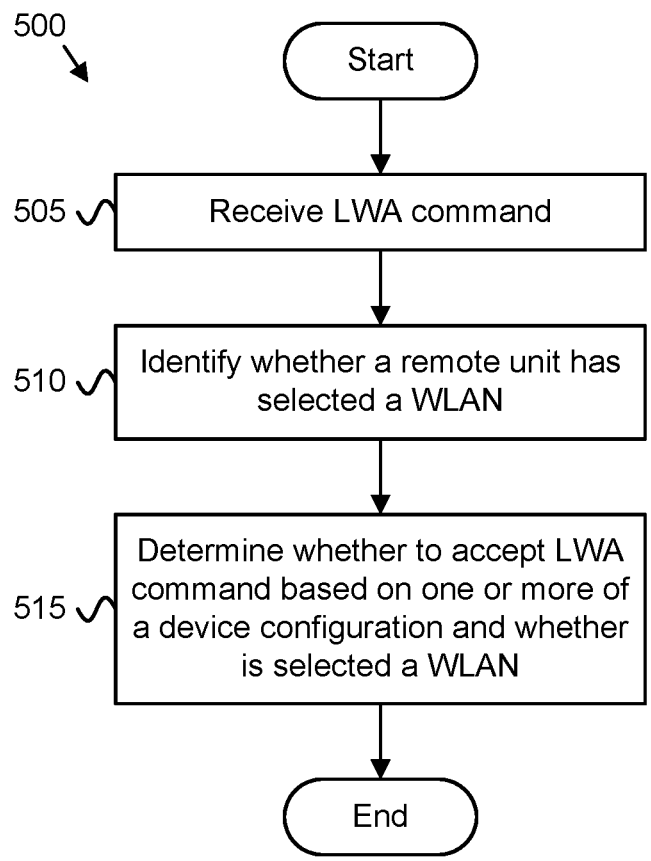
FIG. 5 is a schematic flow chart illustrating one embodiment of WLAN selection information.

FIG. 5 is a schematic flow chart diagram illustrating one embodiment of a method 500 for WLAN selection. In some embodiments, the method 500 is performed by an apparatus, such as the remote unit 105 or UE 205. In certain embodiments, the method 500 may be performed by a processor executing program code, for example, a microcontroller, a microprocessor, a CPU, a GPU, an auxiliary processing unit, a FPGA, or the like.

The method 500 may include receiving 505 a LWA command. In some embodiments, the LWA command includes instructions for the remote unit 105 to select a particular WLAN. The LWA command may be received from a RAN of a serving PLMN.

The method 500 includes identifying 510 whether a remote unit 105 has selected a WLAN. In certain embodiments, identifying 510 includes determining a manner of selection, where the remote unit 105 has selected a WLAN. For example, a WLAN may be selected based on user preferences, by WLAN selection policy (e.g., ANDSF rules), and the like.

The method 500 includes determining 515 whether to accept the LWA command based on one or more of: a device configuration of the remote unit and whether the remote unit has selected a WLAN. The method 500 ends. Determining 515 whether to accept or ignore the LWA command is discussed in further detail below with regard to FIG. 6.

Figure 6:
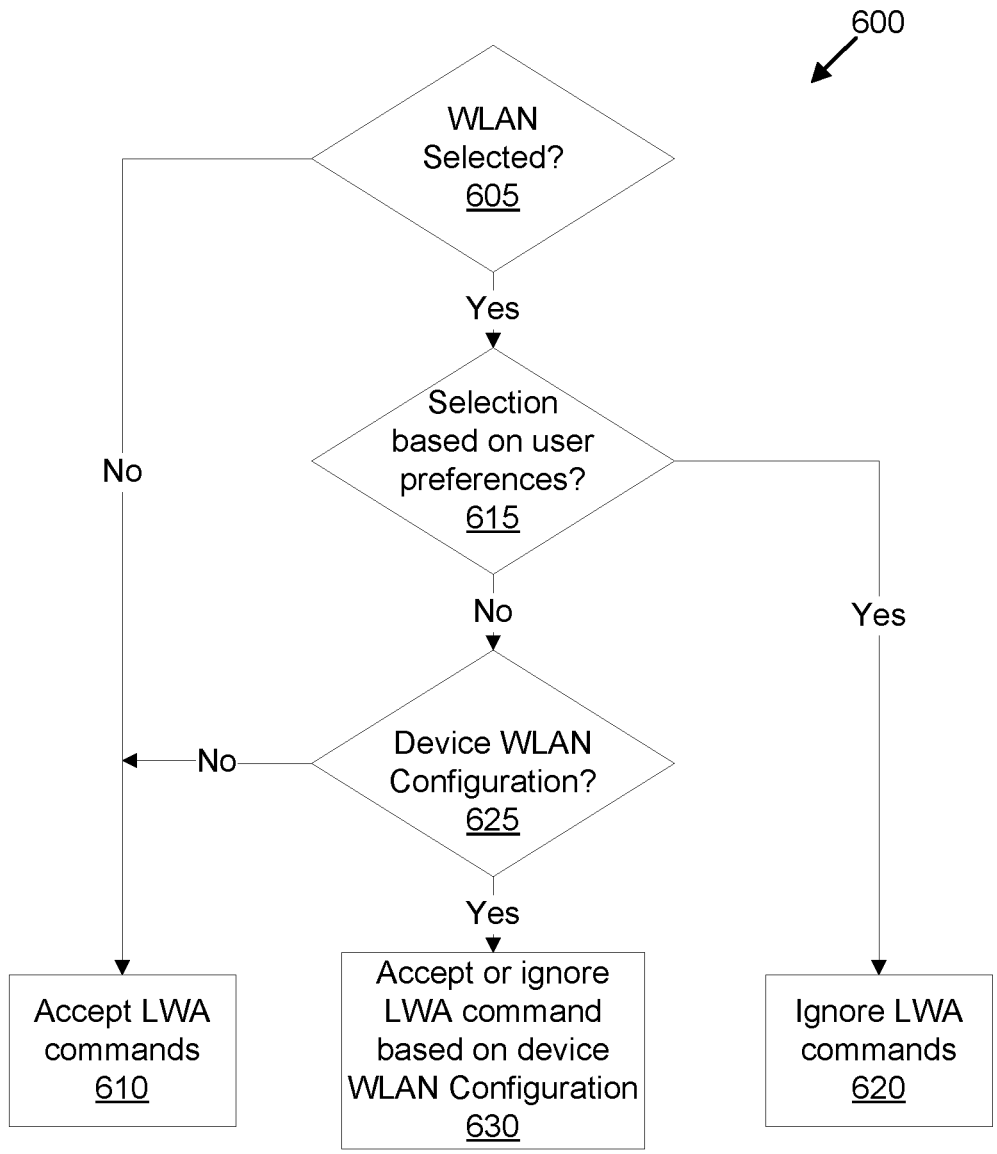
FIG. 6 is a schematic flow chart diagram illustrating another embodiment of a method for WLAN selection.

FIG. 6 is a schematic flow chart diagram illustrating a method 600 for WLAN selection. The method 600 specifically addresses determining whether to accept or ignore LWA (and RCLWI/LWIP) commands. In some embodiments, the method 600 is performed by an apparatus, such as the remote unit 105 or UE 205. In certain embodiments, the method 600 may be performed by a processor executing program code, for example, a microcontroller, a microprocessor, a CPU, a GPU, an auxiliary processing unit, a FPGA, or the like.

The method 600 initially determines 605 whether a WLAN is selected. This step corresponds to step 510 of method 500. If no WLAN is selected, then the method 600 determines to accept 610 LWA commands (and RCLWI/LWIP commands). Otherwise, if a WLAN is selected, then the method 600 determines 615 whether the WLAN was selected based on user preferences.

If the WLAN was selected based on user preferences, then the method 600 determines to ignore 620 LWA commands (and RCLWI/LWIP commands). Here, the user preferences have precedence over LWA commands, so the LWA commands are ignored. Otherwise, if the WLAN was not selected based on user preferences, then the method 600 determines 625 whether the remote unit 105 (or UE 205) includes a device WLAN configuration. As discussed above, the device WLAN configuration contains instructions concerning accepting and ignoring WLAN steering rules. If the remote unit 105 (or UE 205) does not include a device WLAN configuration, then the method 600 determines to accept 610 LWA commands.

Otherwise, if the remote unit 105 (or UE 205) includes a device WLAN configuration, then the method 600 selectively accepts and ignores 630 LWA commands (and RCLWI/LWIP commands) based on the device WLAN configuration. If present, the device WLAN configuration has precedence over the LWA commands. In some situations, a device WLAN configuration instructs the remote unit 105 to always accept LWA/RCLWI/LWIP commands or to always ignore LWA/RCLWI/LWIP commands. In other situations, the device WLAN configuration instructs the remote unit 105 to only accept (or ignore) LWA/RCLWI/LWIP commands that involve specific networks (e.g., specific PLMNs). The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a transceiver that receives wireless local area network ("WLAN") selection rules from an Access Network Discovery and Selection Function in a home public land mobile network ("PLMN"); and
   receiving a WLAN selection/routing command from a radio access in a serving PLMN; and
   a controller that:
   identifies whether a remote unit is connected to a WLAN, in response to receiving the WLAN selection/routing command;
   accepts the WLAN selection/routing command in response to the remote unit not having selected a WLAN;
   determines a basis for WLAN selection in response to the remote unit having selected a WLAN, the basis comprising one of user preference and WLAN selection rules;
   ignores the WLAN selection/routing command in response to the remote unit having selected a WLAN based on user preference;
   determines whether the remote unit is provisioned with a device WLAN configuration in response to the remote unit having selected the WLAN based on WLAN selection rules, the device WLAN configuration comprising instruction for accepting and ignoring WLAN selection/routing commands;
   accepts the WLAN selection/routing command in response to the remote unit not being provisioned with a device WLAN configuration;
   accepts the WLAN selection/routing command according to the device WLAN configuration in response to the remote unit being configured with the device WLAN configuration comprising instruction for accepting the WLAN selection/routing command and in response to having selected a WLAN based on WLAN selection rules; and
   ignores the WLAN selection/routing command in response to the remote unit being provisioned with a device WLAN configuration comprising instruction for ignoring the WLAN selection/routing command and in response to the remote unit having selected a WLAN based on WLAN selection rules.

2. The apparatus of claim 1, wherein the WLAN selection/routing is one of a long-term evolution ("LTE") WLAN aggregation ("LWA") command, a radio access network controlled LTE-WLAN Interworking ("RCLWI") command, and a LTE wireless local area aggregation with internet protocol security tunneling ("LWIP") command.

3. The apparatus of claim 1, wherein the device configuration instructs the controller to always accept WLAN selection/routing commands.

4. The apparatus of claim 1, wherein the device configuration instructs the controller to only ignore WLAN selection/routing commands from specific networks.

5. The apparatus of claim 1, wherein the device configuration instructs the controller to only accept WLAN selection/routing commands from specific long-term evolution ("LTE") networks.

6. The apparatus of claim 1,
   wherein the transceiver receives a WLAN selection policy from a network entity and the controller further selects a WLAN based on the WLAN selection policy.

7. The apparatus of claim 6, further comprising a timer that initiates in response to the apparatus entering an idle mode, wherein the controller prevents WLAN re-selection using the WLAN selection policy in response to the timer being active and triggers WLAN re-selection using the WLAN selection policy in response to expiration of the timer.

8. The apparatus of claim 7, wherein the controller stops the timer and triggers WLAN re-selection in response to the apparatus transitioning from the idle mode to a connected mode before expiration of the timer.

9. The apparatus of claim 1, wherein the controller further selects a WLAN other than one indicated in a preconfigured WLAN selection policy, in response to accepting the WLAN selection/routing command.

10. A method comprising:
    receiving wireless local area network ("WLAN") selection rules from an Access Network Discovery and Selection Function in a home public land mobile network ("PLMN");
    receiving a WLAN selection/routing command from a radio access in a serving PLMN;
    identifying whether a remote unit is connected to a WLAN, in response to receiving the WLAN selection/routing command;
    accepting the WLAN selection/routing command in response to the remote unit not having selected a WLAN;
    determining a basis for WLAN selection in response to the remote unit having selected a WLAN, the basis comprising one of user preference and WLAN selection rules;
    ignoring the WLAN selection/routing command in response to the remote unit having selected a WLAN based on user preference;
    determining whether the remote unit is provisioned with a device WLAN configuration in response to the remote unit having selected the WLAN based on WLAN selection rules, the device WLAN configuration comprising instruction for accepting and ignoring WLAN selection/routing commands;
    accepting the WLAN selection/routing command in response to the remote unit not being provisioned with a device WLAN configuration;
    accepting the WLAN selection/routing command according to the device WLAN configuration in response to the remote unit being configured with the device WLAN configuration comprising instruction for accepting the WLAN selection/routing command and in response to the remote unit having selected a WLAN based on user preference; and ignoring the WLAN selection/routing command in response to the remote unit being provisioned with a device WLAN configuration comprising instruction for ignoring the WLAN selection/routing command and in response to the remote unit having selected a WLAN based on WLAN selection rules.

11. The method of claim 10, wherein the WLAN selection/routing is one of a long-term evolution ("LTE") WLAN aggregation ("LWA") command, a radio access network controlled LTE-WLAN Interworking ("RCLWI") command, and a LTE wireless local area aggregation with internet protocol security tunneling ("LWIP") command.

12. The method of claim 10, wherein the device configuration instructs the remote unit to always accept WLAN selection/routing commands.

13. The method of claim 10, wherein the device configuration instructs the remote unit to only ignore WLAN selection/routing commands from specific networks.

14. The method of claim 10, wherein the device configuration instructs the remote unit to only accept WLAN selection/routing command from specific long-term evolution ("LTE") networks.

15. The method of claim 10, further comprising:
receiving a WLAN selection policy from a network entity; and
selecting a WLAN based on the WLAN selection policy.

16. The method of claim 15, further comprising:
initiating a timer in response to the remote unit entering an idle mode;
preventing WLAN re-selection using the WLAN selection policy in response to the timer being active; and
triggering WLAN re-selection using the WLAN selection policy in response to expiration of the timer.

17. The method of claim 16, further comprising stopping the timer and triggering WLAN re-selection in response to the remote unit transitioning from the idle mode to a connected mode before expiration of the timer.

18. The method of claim 10, further comprising selecting a WLAN other than one indicated in a preconfigured WLAN selection policy, in response to accepting the WLAN selection/routing command.

* * * * *